US012678991B2

(12) United States Patent

Ryan et al.

(10) Patent No.: US 12,678,991 B2

(45) Date of Patent: Jul. 14, 2026

(54) METHOD OF MANUFACTURING MATERIAL DISPLAY SYSTEM

(71) Applicant: Michael Ryan, Lenox, MA (US)

(72) Inventors: Michael Ryan, Lenox, MA (US); Gary Tibbetts, Pittsfield, MA (US)

(73) Assignee: Michael Ryan, Lenox, MA (US)

( * ) Notice: Subject to any disclaimer, the term of this patent is extended or adjusted under 35 U.S.C. 154(b) by 0 days.

(21) Appl. No.: 19/146,035

(22) PCT Filed: Feb. 6, 2025

(86) PCT No.: PCT/US2025/014885

§ 371 (c)(1),
(2) Date: Jul. 7, 2025

(87) PCT Pub. No.: WO2025/171192

PCT Pub. Date: Aug. 14, 2025

(65) Prior Publication Data

US 2026/0115960 A1 Apr. 30, 2026

Related U.S. Application Data

(60) Provisional application No. 63/660,116, filed on Jun. 14, 2024, provisional application No. 63/550,297, filed on Feb. 6, 2024.

(51) Int. Cl.

*B26F 1/26* (2006.01)
*A47F 7/00* (2006.01)
(Continued)

(52) U.S. Cl.

CPC .............. *B26F 1/26* (2013.01); *A47F 7/0042* (2013.01); *A47F 7/163* (2013.01); *E04B 2001/389* (2023.08); *G09F 5/00* (2013.01)

(58) Field of Classification Search

CPC .. B26F 1/26; G09F 5/00; A47F 7/0042; A47F 7/163; E04B 2001/389

See application file for complete search history.

(56) References Cited

U.S. PATENT DOCUMENTS 2,011,843 A * 8/1935 Butler .................. A47F 7/0042 434/74
2,013,741 A * 9/1935 Butler .................. A47F 7/0042 434/74

(Continued)

FOREIGN PATENT DOCUMENTS

CN 106108517 A 11/2016
CN 207594100 U 7/2018

(Continued)

OTHER PUBLICATIONS

H&H, "Miscellaneous Track Hardware" (2011).
Mussion Musical, "Right Angle Suspension Clamp," https://www.musson.com/435r-right-angle-batten-suspension-clamp.html.

*Primary Examiner* — Jermie E Cozart

(74) *Attorney, Agent, or Firm* — 24IP Law Group USA, PLLC; Timothy R DeWitt

(57) ABSTRACT

A method for manufacturing a display system having a monolithic building material having a hole therein, a structural support and a male/female connector connecting the structural support to the monolithic building material through the hole in the monolithic building material.

14 Claims, 20 Drawing Sheets

(51) Int. Cl.

| | |
|---|---|
| *A47F 7/16* | (2006.01) |
| *E04B 1/38* | (2006.01) |
| *G09F 5/00* | (2006.01) |

(56) References Cited

U.S. PATENT DOCUMENTS

| | | | | | |
|---|---|---|---|---|---|
| 3,530,593 | A | | 9/1970 | Howard | |
| 3,530,984 | A | | 9/1970 | Howard | |
| 4,266,677 | A | * | 5/1981 | Dewsnap | G09F 5/00 211/113 |
| 6,446,932 | B1 | | 9/2002 | Fairfield | |
| 6,526,626 | B1 | | 3/2003 | Lotufo | |
| 8,573,411 | B2 | | 11/2013 | Folz et al. | |
| 11,844,448 | B2 | * | 12/2023 | Spiro | A47G 1/0638 |
| 2002/0023890 | A1 | * | 2/2002 | Jensen | A47F 7/0042 211/47 |
| 2008/0093319 | A1 | * | 4/2008 | Stover | A47B 97/001 211/85.26 |
| 2009/0081621 | A1 | | 3/2009 | Harrison | |
| 2009/0107934 | A1 | | 4/2009 | Cooper | |
| 2013/0284686 | A1 | * | 10/2013 | Robbins, III | A47F 7/0042 211/175 |
| 2015/0079547 | A1 | | 3/2015 | Moss | |
| 2016/0020374 | A1 | | 1/2016 | Aketa et al. | |
| 2016/0148545 | A1 | | 5/2016 | Donadee et al. | |
| 2018/0125264 | A1 | | 5/2018 | Patrick et al. | |
| 2018/0281224 | A1 | | 10/2018 | Grijalva, II | |
| 2023/0401982 | A1 | | 12/2023 | Lee | |

FOREIGN PATENT DOCUMENTS

| | | | | | |
|---|---|---|---|---|---|
| CN | 108657820 | B | * | 8/2019 | B26F 3/004 |
| CN | 211483788 | U | * | 9/2020 | |
| CN | 111923252 | A | * | 11/2020 | B28D 1/22 |
| CN | 220024661 | U | | 11/2023 | |
| DE | 4302427 | A1 | * | 8/1993 | A47F 7/0042 |
| EP | 1834550 | A1 | * | 9/2007 | A47F 7/0042 |
| GB | 2262765 | A | * | 6/1993 | G09F 7/18 |
| GB | 2262765 | | | 8/1994 | |
| WO | 2004073463 | | | 9/2004 | |
| WO | WO-2004073463 | A1 | * | 9/2004 | G09F 5/00 |

* cited by examiner

400

500

700

METHOD OF MANUFACTURING MATERIAL DISPLAY SYSTEM

CROSS-REFERENCE TO RELATED APPLICATIONS

The present application claims the benefit of the filing date U.S. Provisional Patent Application Ser. No. 63/660,116 filed on Jun. 14, 2024, and U.S. Provisional Patent Application Ser. No. 63/550,297 filed by the present inventor on Feb. 6, 2024.

The aforementioned provisional patent application is hereby incorporated by reference in its entirety.

BACKGROUND OF THE INVENTION

Field of the Invention

The present invention relates to a method for manufacturing a material display system for allowing heavy materials to be handled and displayed safely and conveniently via a hole in the material.

Brief Description of the Related Art

As used herein "monolithic building material" means a construction item that commonly is displayed for a point of purchase selection by a customer and is dense (i.e., density greater than 1300 kg/m$^3$), heavy, rigid, breakable, and resistant to conventional drilling, including but not limited to ceramic tile, porcelain tile, glass tile, granite tile, travertine, quartzite, sandstone, stone, concrete, Cementous siding, slate, pavers, and synthetic materials with similar densities. These materials can be for outdoor or indoor use and may be used, for example, on a floor, wall, roof, countertop or landscape. These dense, heavy, rigid and breakable building materials are more difficult to display safely and effectively than less dense materials such as rubber (density approximately 1100 kg/m$^3$), polyethylene (density approximately 1100 kg/m$^3$), wood (density approximately 500-1800 kg/m$^3$), or carpet (carpet underlay density approximately 110 kg/m$^3$). Monolithic building materials have been and are handled and displayed in a variety of ways at the point of purchase, ranging from loose materials to display boards having materials mounted to them. In recent years material sizes have been increasing, making displaying monolithic building materials at points of purchase more difficult, and in some instances for very large materials dangerous to handle and display. Current trends include monolithic building materials that are 12"×18", 12"×24", 24"×24", 24"×48" and even 48"×60. Even larger monolithic materials are possible. These large items can be very heavy and difficult to handle safely. Moreover, mounting such materials securely to displays can be difficult and exceed OSHA safety handling requirements.

SUMMARY OF THE INVENTION

In a preferred embodiment, the present invention is a method for manufacturing monolithic build material display systems using a robotic water jet and an indexing table having a plurality of fixture cavities in first and second locations on the table. The method comprises loading a rigid building material having a density great than kg/m$^3$ into each of a plurality of fixture cavities in the first location of the indexing table, rotating the indexing table to place the rigid building materials in the plurality of fixture cavities in the first location on the indexing table within a range of the robotic water jet water jet cutting a hole in the rigid building materials in each fixture cavity in the first location in the indexing table, removing any cut parts in the plurality of fixture cavities in the second location in the indexing table, rotating the indexing table to place the rigid building materials in the plurality of fixture cavities in the second location on the indexing table within a range of the robotic water jet, water jet cutting a hole in the rigid building materials in each fixture cavity in the second location in the indexing table, removing any cut parts in the plurality of fixture cavities in the first location in the indexing table, connecting a rigid building material carrier to each rigid building material using the hole cut in the rigid building material. The rigid building material carrier has a structural member with an I-shaped cross-section, a back support member extending from a rear side of a bottom of the structural member onto a back face of the rigid building material, the back support having a hole for receiving a pin, the hole in the back support being aligned with the hole in the rigid building material, a front support connected to the back support, the front support having a front support member extending from a front side of a bottom of the front support onto a front face of the rigid building material, and a connector having a head on a front side of the rigid building material and a pin extending from the head on the front face of the rigid building material, through the hole in the rigid building material and secured in the hole in the back support member. The rigid building material carrier may further have a handle extending from a top side of the structural support. The handle may have an opening ergonomically shaped to receive three or four fingers. The rigid building material may comprise one of ceramic, porcelain, stone, ceramic tile, porcelain tile, glass tile, granite tile, travertine, quartzite, sandstone, stone, concrete, Cementous siding, slate, or pavers. The front support, the back support and the connector may comprise injection-molded plastic or aluminium. The back support member may have a front side facing the rigid building material and a backside having printed matter. The printed matter on the backside of the back support member comprises a label. The hole in the rigid building material is within three inches of a side of the rigid building material.

In still another embodiment, the present invention is a method for displaying monolithic building materials. The method comprises the steps of making a hole in a monolithic building material with a water jet or laser, connecting an I-beam support member to the monolithic building material with a male/female connector through the hole in the monolithic building material; and sliding the I-beam support connected to the building material into a slot in a display stand. The method may further include repeating these steps for second and subsequent monolithic building materials to create a single display of a plurality of monolithic building materials. The display stand may be a vertical display, a horizontal display, or a display integral with a workstation.

Still other aspects, features, and advantages of the present invention are readily apparent from the following detailed description, simply by illustrating a preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature and not as restrictive. Additional objects and advantages of the invention will be set forth in part in the description which follows and in part will be obvious from the description or may be learned by practice of the invention.

BRIEF DESCRIPTION OF THE DRAWINGS

For a more complete understanding of the present invention and the advantages thereof, reference is now made to the following description and the accompanying drawings, in which:

FIGS. 1A-1I illustrate a system for handling and/or displaying a monolithic building material at a point of purchase in accordance with a preferred embodiment of the present invention.

DETAILED DESCRIPTION OF THE PREFERRED EMBODIMENTS

Figure 10:
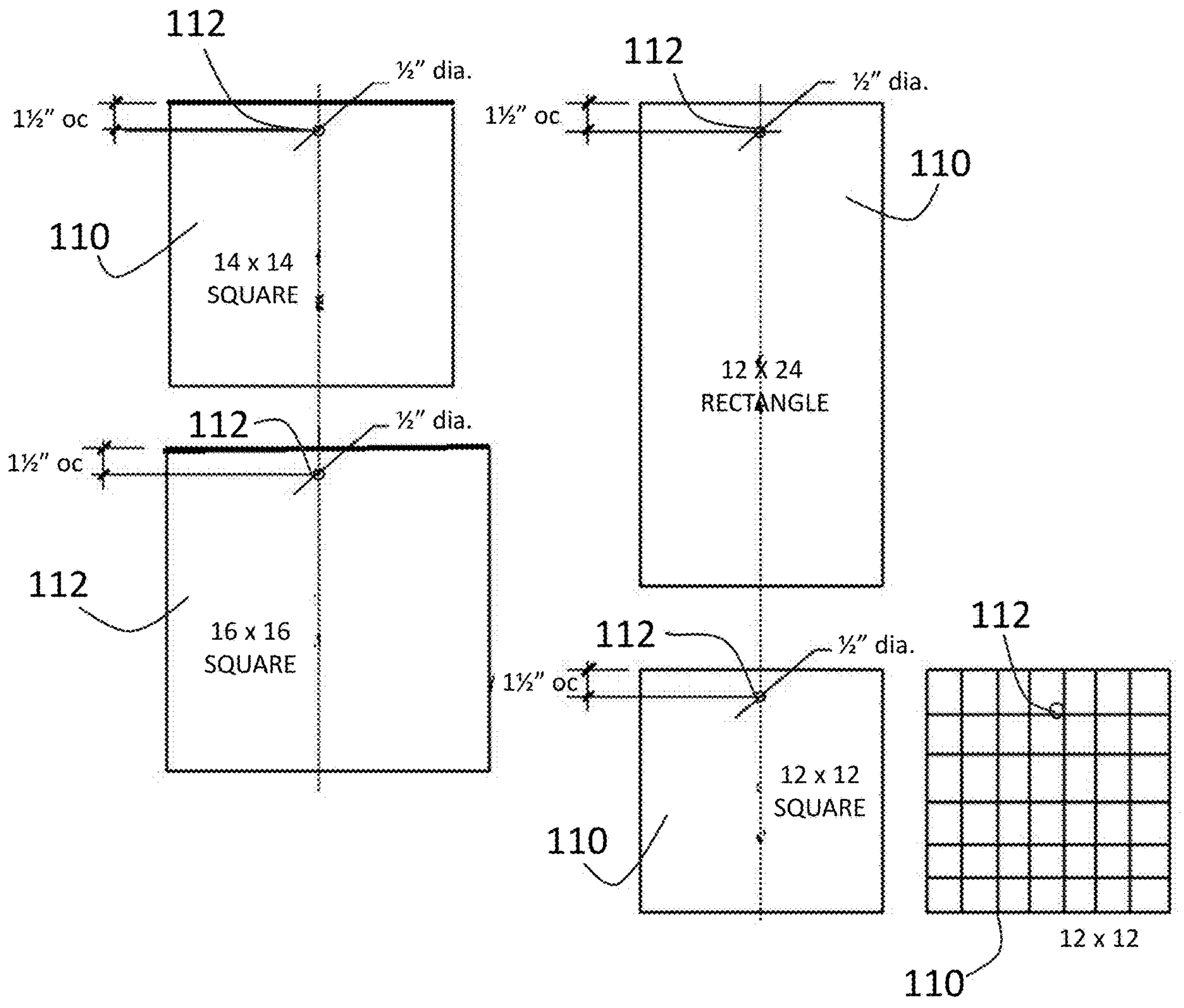
FIG. 10 is a diagram of various arrangements of a monolithic building material with a hole for a system for handling and/or displaying a monolithic building material at a point of purchase in accordance with a preferred embodiment of the present invention.

Preferred embodiments of the present invention will be described with reference to the drawings. As shown in FIGS. 1A-1I, a system (100) for handling and/or displaying a monolithic building material at a point of purchase comprises a monolithic building material (110) having a hole (112) therein and a sleeve or monolithic building material support (120) connected to the monolithic building material (110). As shown in FIG. 10, the monolithic building material (110) may be of many different types, shapes and sizes or may be a sheet of smaller monolithic building materials, and the hole (112) preferably is positioned near one side of the monolithic building material. The monolithic building material has a density greater than 1300 kg/m$^3$. The monolithic building material may be, for example, ceramic tile (density approximately 1400 kg/m$^3$), porcelain tile (density approximately 2400 kg/m$^3$), glass tile (density approximately 2500 kg/m$^3$), marble tile (density approximately 2711 kg/m$^3$), granite tile (density approximately 1400 kg/m$^3$), natural stone tile, travertine (density approximately 2700 kg/m$^3$), quartzite (density approximately 2710 kg/m$^3$), sandstone (density approximately 2323 kg/m$^3$), Corian (density approximately 1700 kg/m$^3$), limestone (density approximately 2750 kg/m$^3$), concrete (density approximately 2700 kg/m$^3$), Cementous siding (nominal density approximately 1332 kg/m$^3$) porcelain tile (density approximately 2400 kg/m$^3$), pavers, or a similar synthetic material having density greater than 1300 kg/m$^3$.

The hole (112) in the monolithic building material (110) may be created, for example, with a waterjet. Further, the water-jetting of holes in the monolithic building material (110) preferably is completed using robotic systems and may be performed on more than one monolithic building material at a time.

In one preferred embodiment the sleeve or monolithic building material support (120) is a handle assembly having a back support (200), a front support (300), a connector 400, and a back support cover 500. The back support (200), as shown in FIGS. 2A-2G, has a back structural member (210) preferably with an I-shaped cross-section. The back support (200) further has a handle (240) extending from a top of the back structural member (210) to create and opening (242) by which the monolithic building material (110) can be lifted or maneuvered. A back support member (220) extends from a rear side of a bottom of the back structural member (210) onto a back face of the monolithic building material (110). The back support member (220) has three holes (222, 224) for receiving a screws (122), one of the holes (224) on the back support (200) being aligned with the hole (112) in the monolithic building material (110).

The front support (300) has a body with holes (322) for receiving screws (122) to connect to the back support (200) onto a front face of the monolithic building material (110). A front support member (330) such as a flange extends from a front side of a bottom of the front support (300) onto a front face of the monolithic building material (110). In a preferred embodiment the front support member (330) extends enough to stabilize the monolithic building material (110) but covers as little of the front face of the monolithic building material (110) as possible to allow a clear view of as much of the front face of the monolithic building material (110) as possible. The front support member (330) in the figures is shown as a continuous flange along the full length of the front support (300) but one of skill in the art will understand that other arrangements, such as a flange that extends along only a portion of the structural support member or a plurality of tabs, may be used with the present invention as long as the front support member (330) has sufficient strength to support the front face of the monolithic building material (110).

The connector (400) has a head (410) on a front side of the monolithic building material (110) and a pin (420) that extends from the head (410) on the front face of the monolithic building material (110), through the hole (112) in the monolithic building material (110) and is secured to the back support member (220) via a screw (122) through hole (224) in the back support member (220). A cover (500) is placed on the back side of the back support (200).

Labels (e.g., 910, 920) with printed matter may be placed on a back face (226) of the back support (220), on front face (310) of the front support member (300), and/or on the head (410) of the connector (400).

The back support (200), front support (300), connector (400) and cover (500) may be formed of injection-molded plastic, aluminium, or other material sufficiently strong to support the monolithic building material from the monolithic building material support (120). As shown in FIGS. 9A, 9B, 10A, and 10B, printed matter may be on a label (910, 920) and may be, for example, a QR code or logo. The system may further have a metal sheath (not shown) on the pin (420) to provide additional strength for supporting the monolithic building material (110). The handle (240) may have an opening ergonomically shaped, for example, to receive three fingers. Further, the handle (240) may be over molded, for example, with a rubber material to provide a better grip. The handle (240) further may have a hole allowing for the system to be hung from a pin or hook, or the opening (242) in the handle (240) may be shaped to allow the system to be hung from a pin or hook by the handle. The head (410) of the connector (400) may be round, square, triangular, or any other shape.

In a second preferred embodiment of the invention, shown in FIGS. 8A-9D, the monolithic building material support (800) has a structural member (810) with an I-shaped cross-section; a front support member (830) extending from a front side of a bottom of the structural member (810) onto a front face of the monolithic building material (110) and over the hole (112) in the monolithic building material (110); a back support member (820) extending from a rear side of a bottom of the structural member (810) onto a back face of the monolithic building material (110), the back support (820) having a post (822) for receiving a pin (852) of a connector (850), the post (822) on the back support (820) being aligned with the hole (112) in the monolithic building material (110); and a handle (840) extending from a top side of the structural support (810).

Other embodiments also are possible. For example, for a very large monolithic building material the system may include the monolithic building material and two or more monolithic building material supports (120), for example, on adjacent sides or on the same side. In addition to providing assistance in lifting or suspending a monolithic building material (110), the present invention may serve other purposes such as serving as bumpers between monolithic building materials during shipping.

Figure 1A:
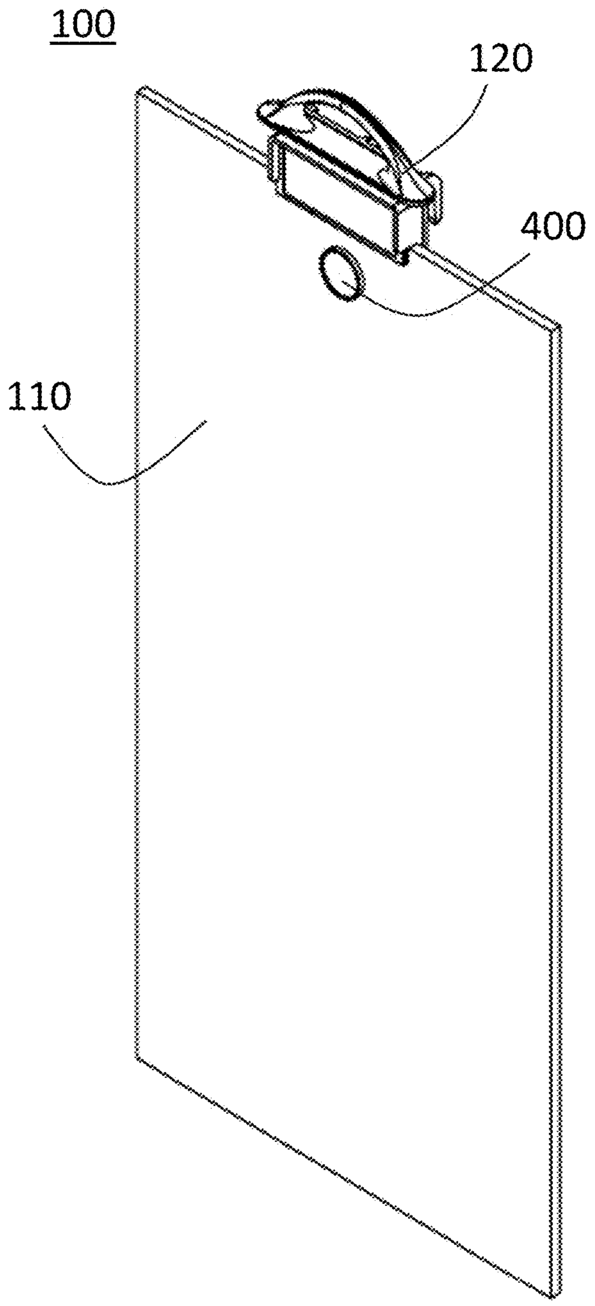
Figure 1B:
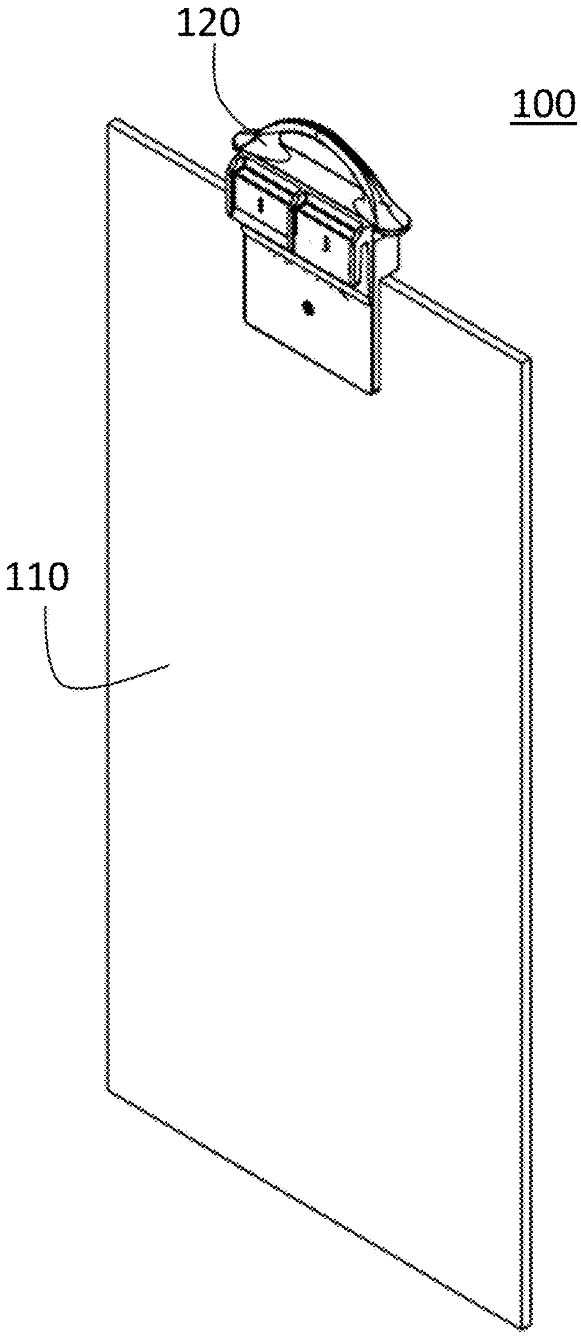
Figure 1C:
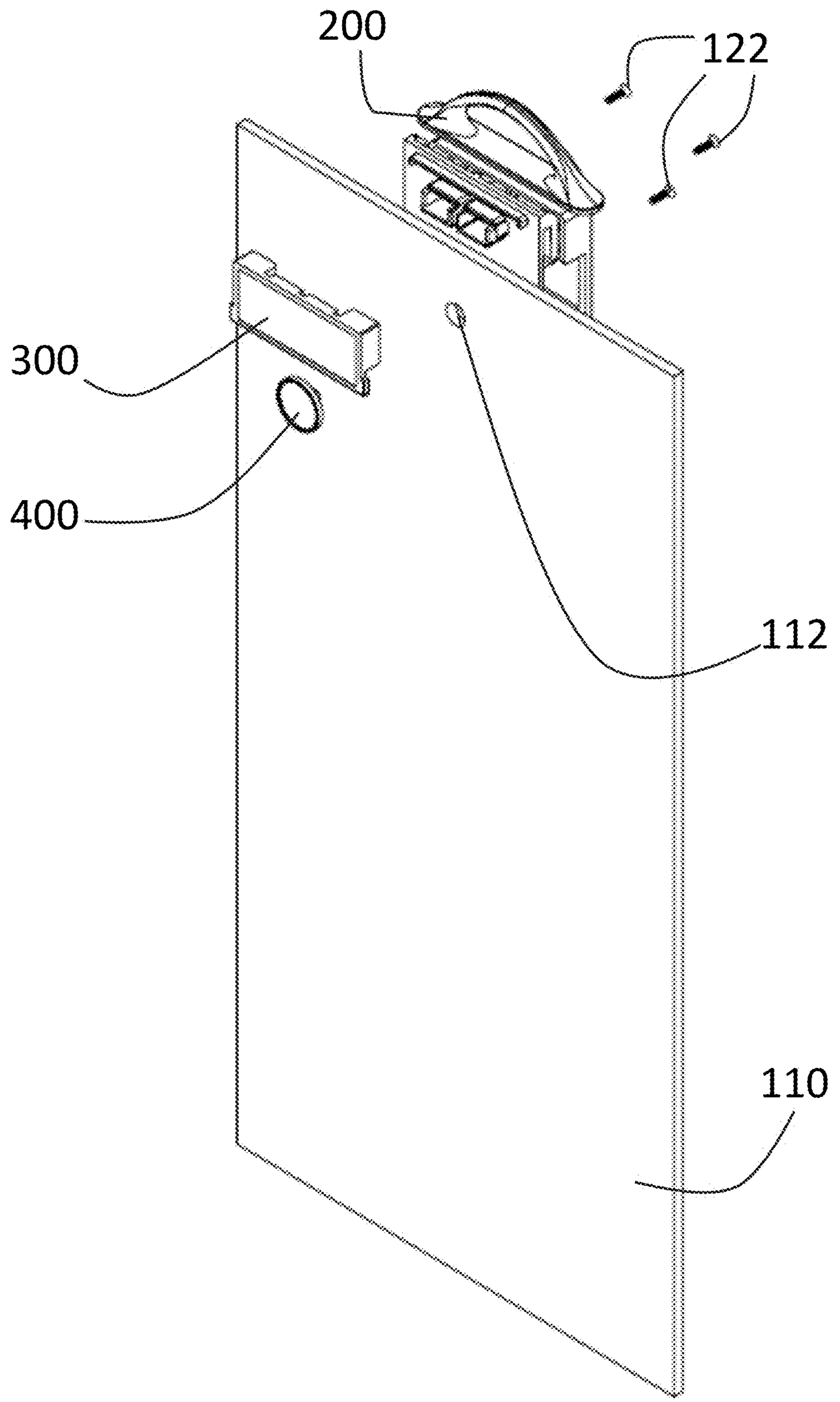
Figure 1D:
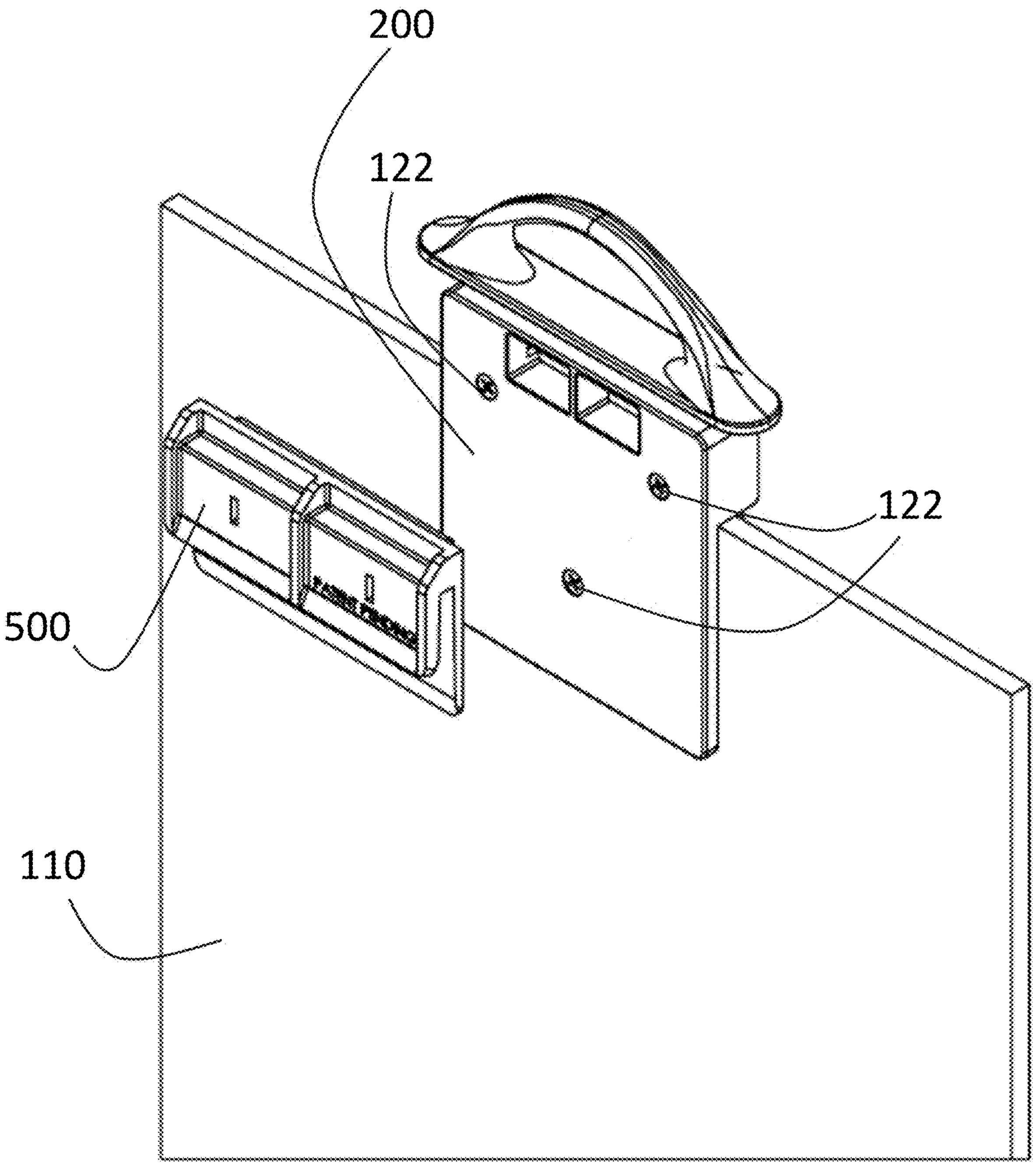
Figures 1E, 1F, 1H, 1I, 2G:
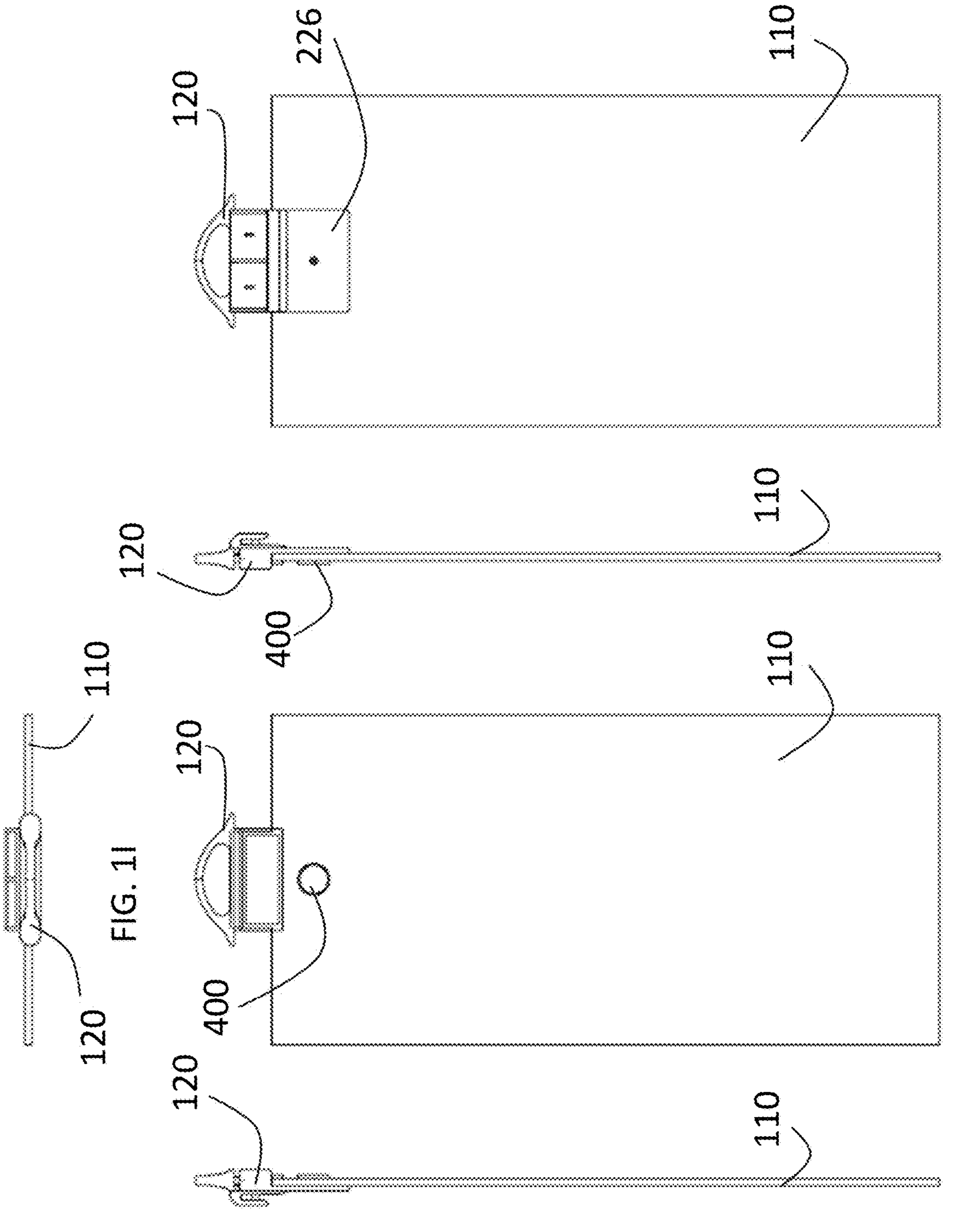
Figure 2B:
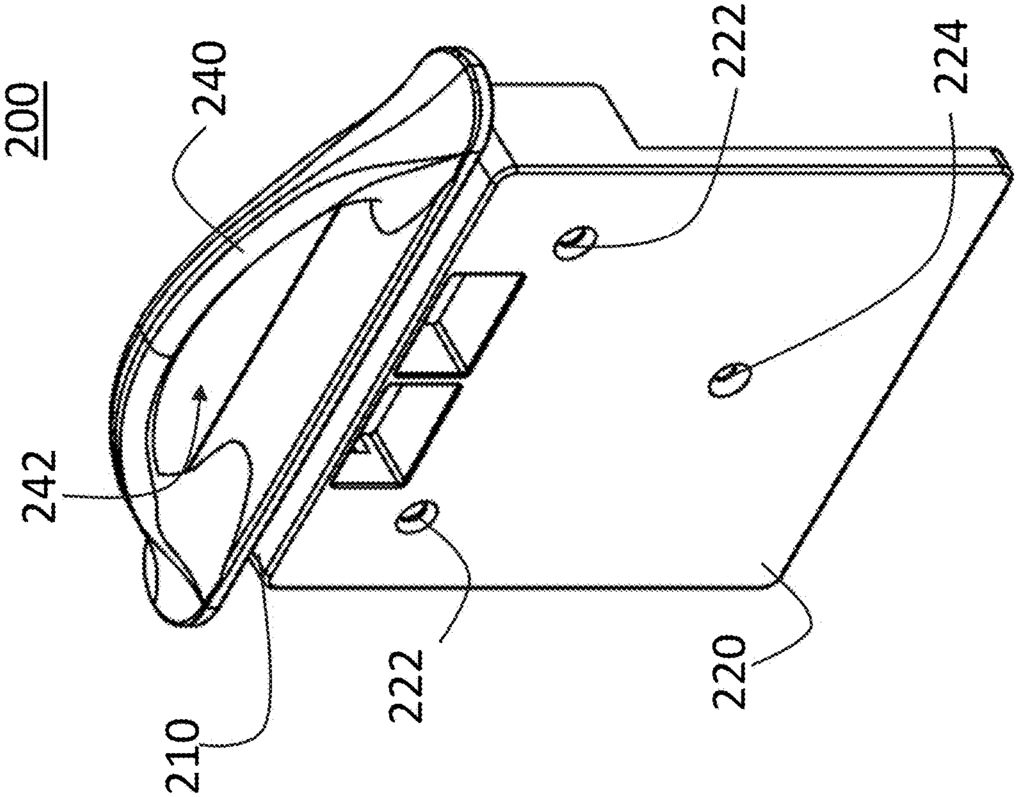
FIGS. 2A-2G illustrate a handle back support of a system for handling and/or displaying a monolithic building material at a point of purchase in accordance with a preferred embodiment of the present invention.
Figure 2A:
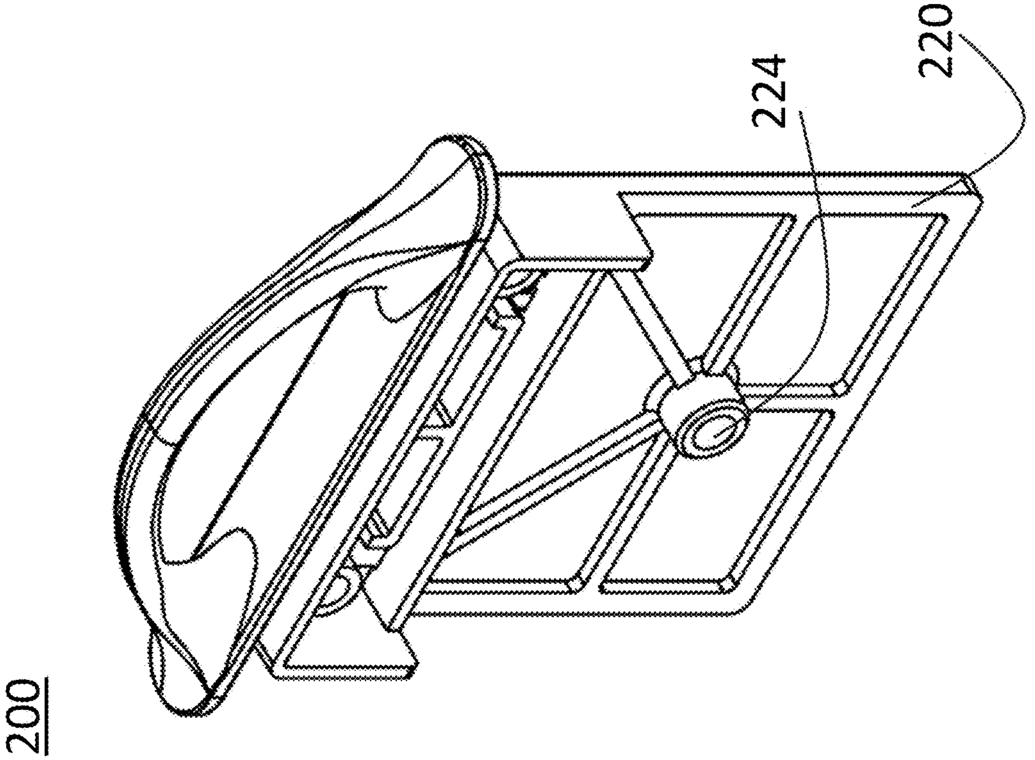
Figure 2F:
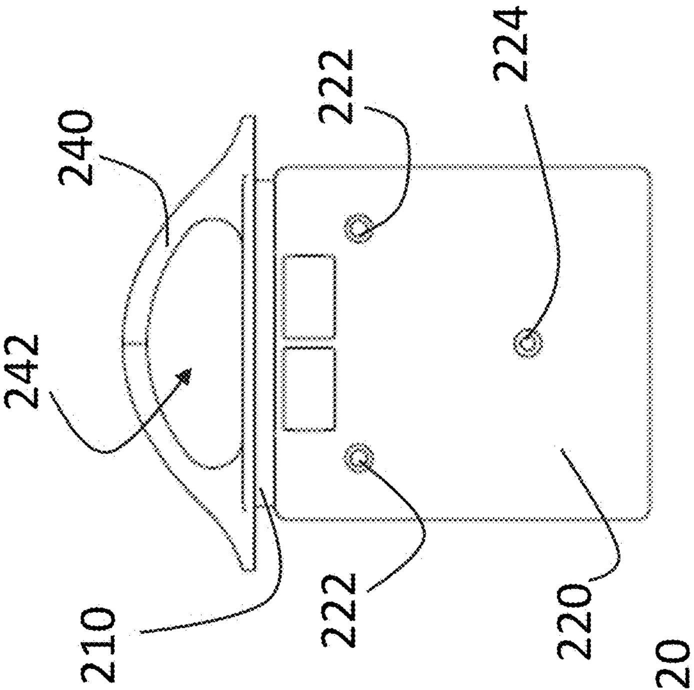
Figure 2E:
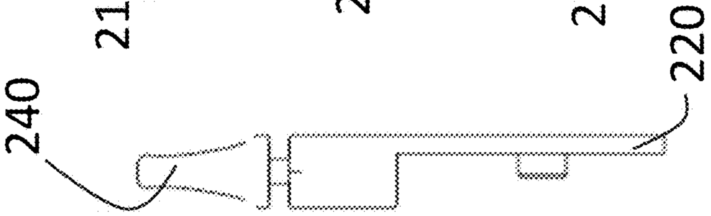
Figure 2D:
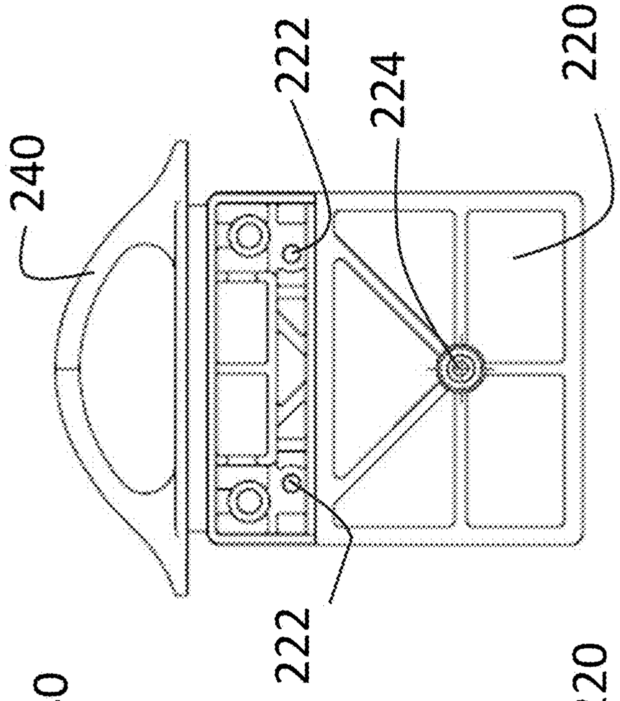
Figure 2G:
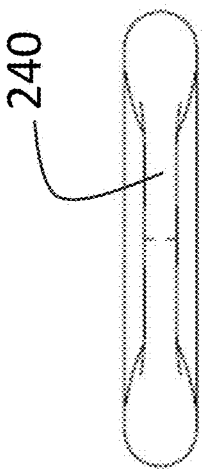
Figure 2C:
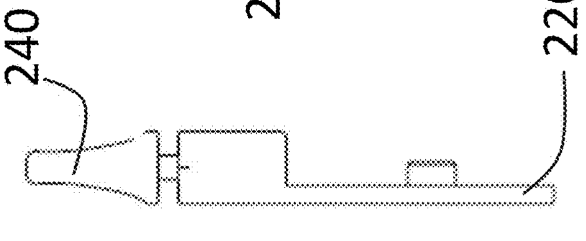
Figure 3A:
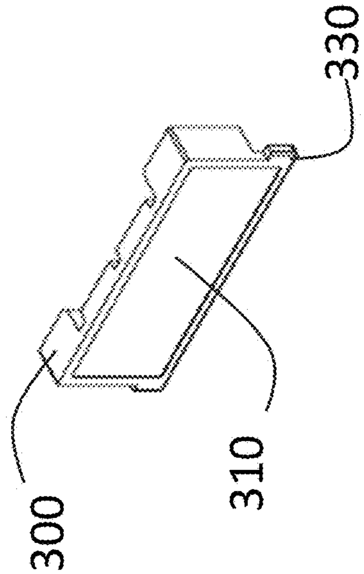
FIGS. 3A-3G illustrate a handle front support of a system for handling and/or displaying a monolithic building material at a point of purchase in accordance with a preferred embodiment of the present invention.
Figure 3B:
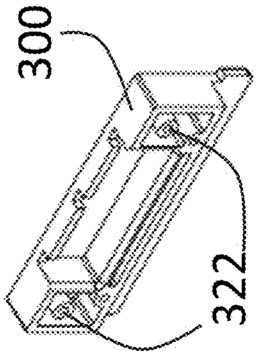
Figure 3C:
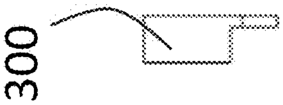
Figure 3D:
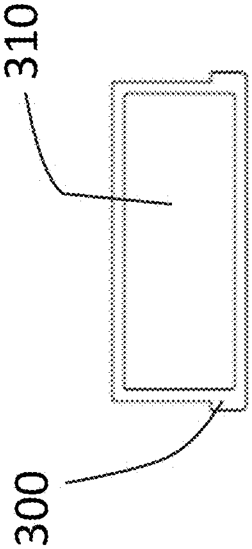
Figure 3E:
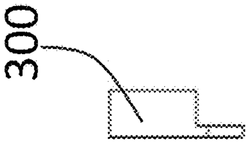
Figure 3F:
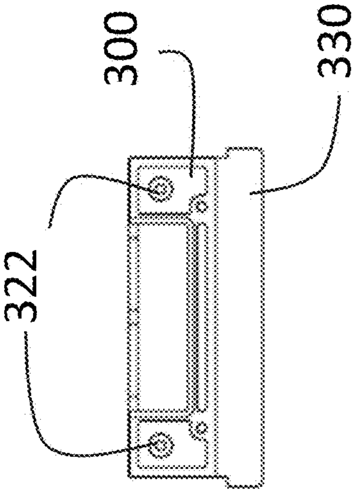
Figure 3G:
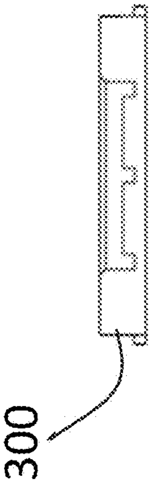
Figure 4B:
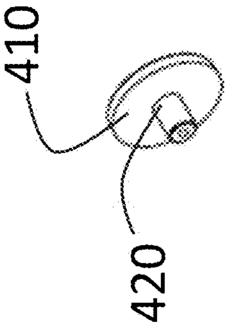
FIGS. 4A-4G illustrate a handle connector of a system for handling and/or displaying a monolithic building material at a point of purchase in accordance with a preferred embodiment of the present invention.
Figure 4A:
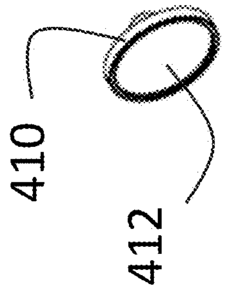
Figure 4F:
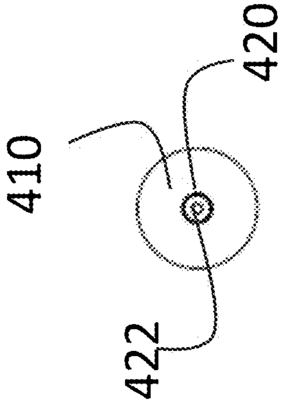
Figure 4E:
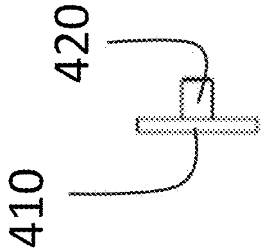
Figure 4G:
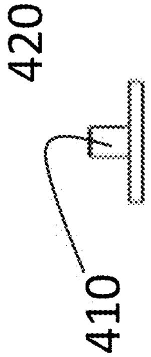
Figure 4D:
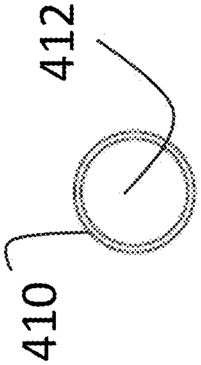
Figure 4C:
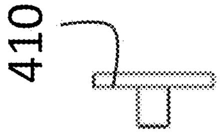
Figure 5A:
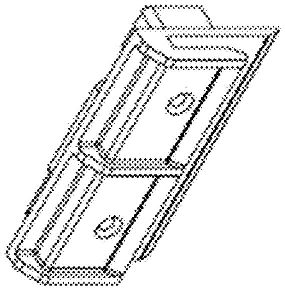
FIGS. 5A-5G illustrate a handle back support cover of a system for handling and/or displaying a monolithic building material at a point of purchase in accordance with a preferred embodiment of the present invention.
Figure 5B:
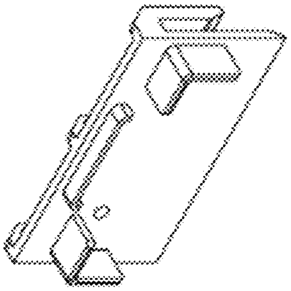
Figure 5C:
Figure 5D:
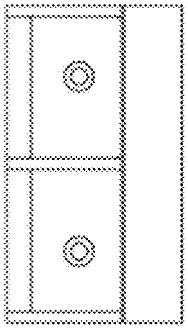
Figure 5E:
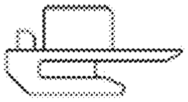
Figure 5F:
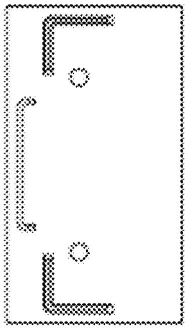
Figure 5G:
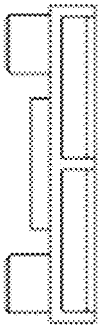
Figures 6A, 6B, 6C, 6D:
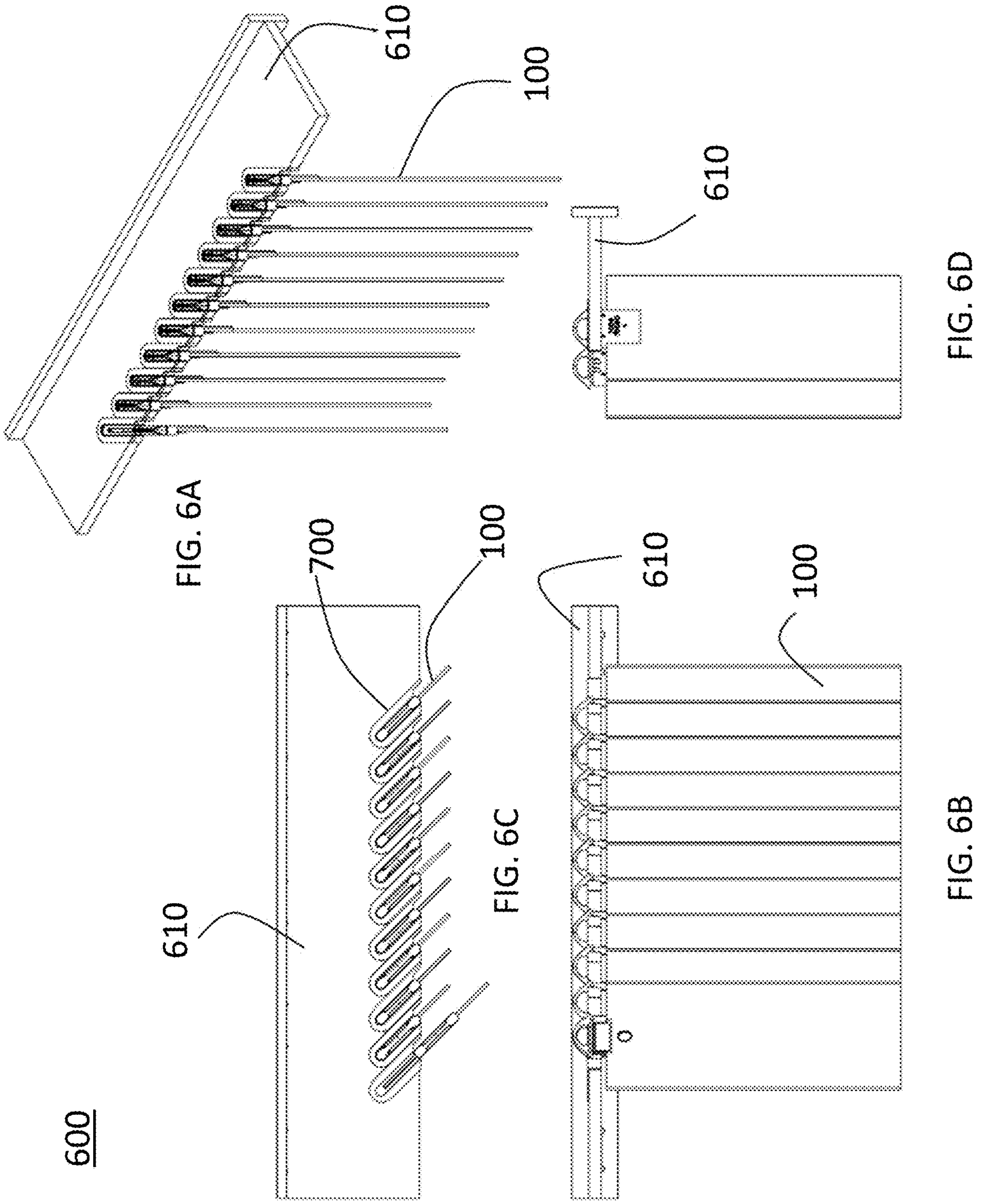
FIGS. 6A-6D a system for displaying a plurality of monolithic building materials at a point of purchase in accordance with a preferred embodiment of the present invention.
Figure 7B:
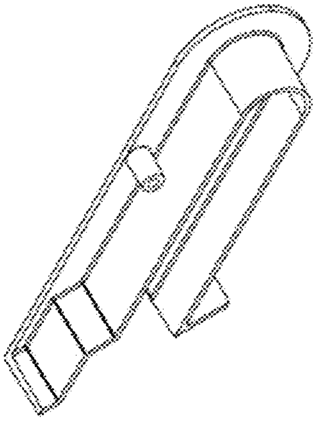
FIGS. 7A-7G illustrate a receiver of a system for displaying a plurality of monolithic building materials at a point of purchase in accordance with a preferred embodiment of the present invention.
Figure 7A:
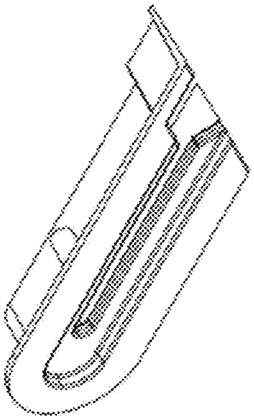
Figure 7G:
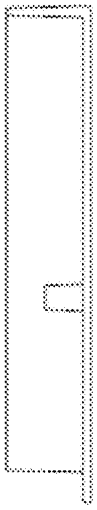
Figure 7F:
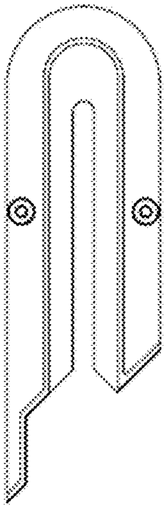
Figure 7E:
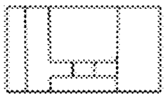
Figure 7D:
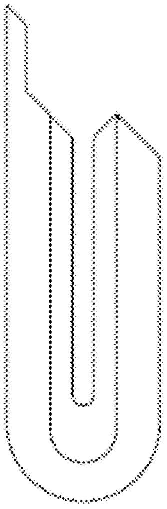
Figure 7C:
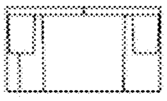
Figure 8A:
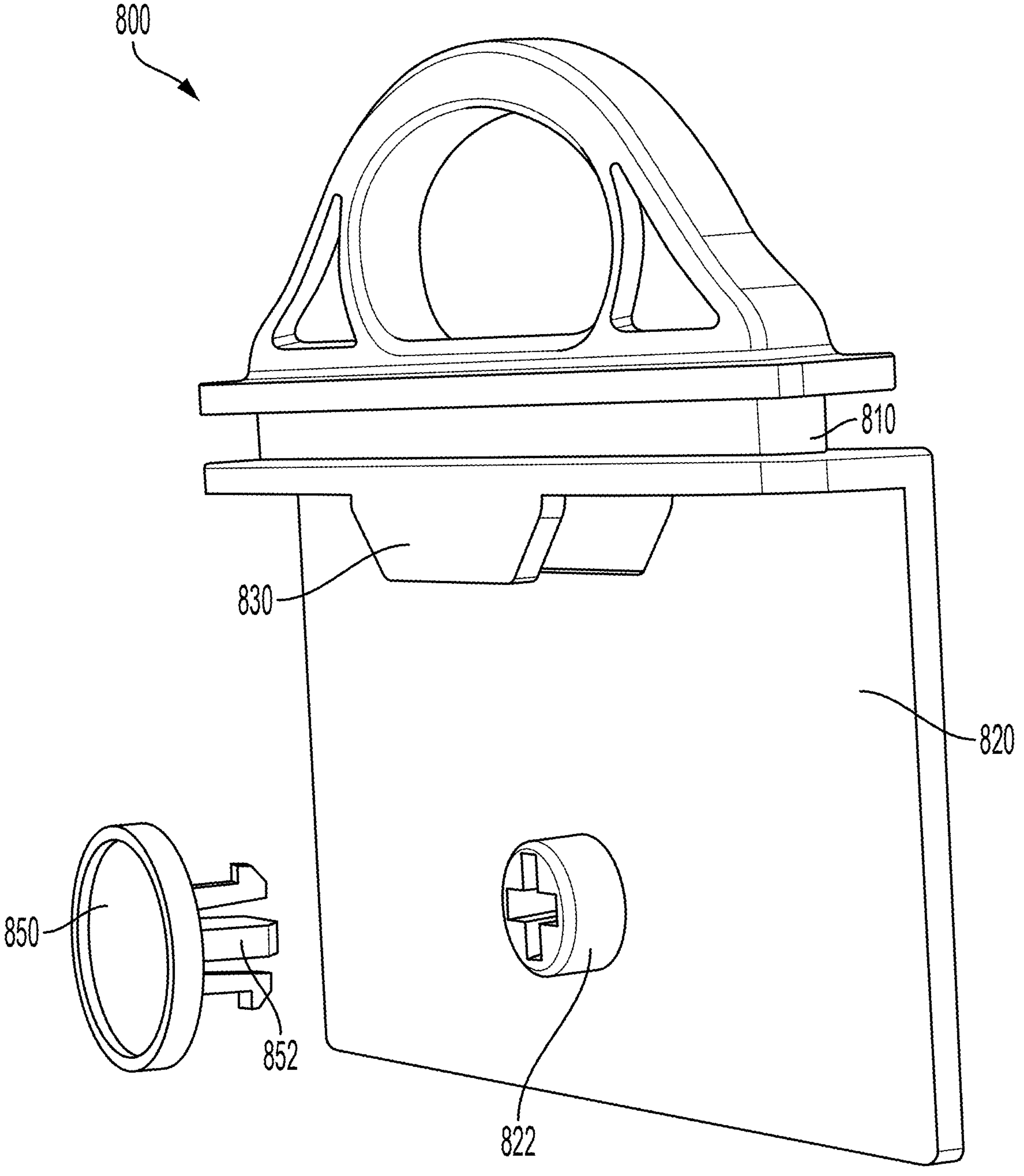
FIGS. 8A-8B illustrate a handle of a monolithic building material support system according to a second preferred embodiment of the present invention.
Figure 8B:
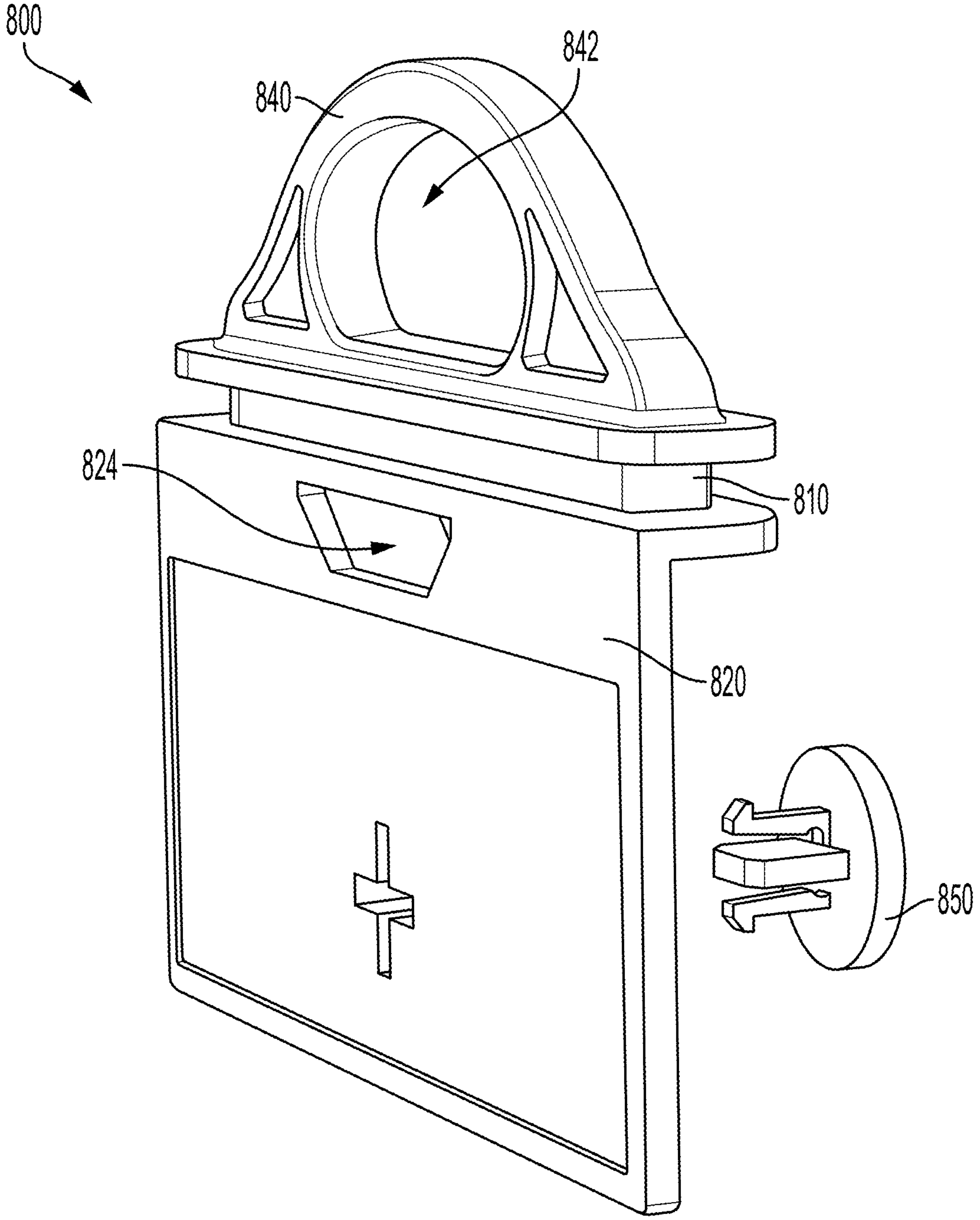
Figure 9A:
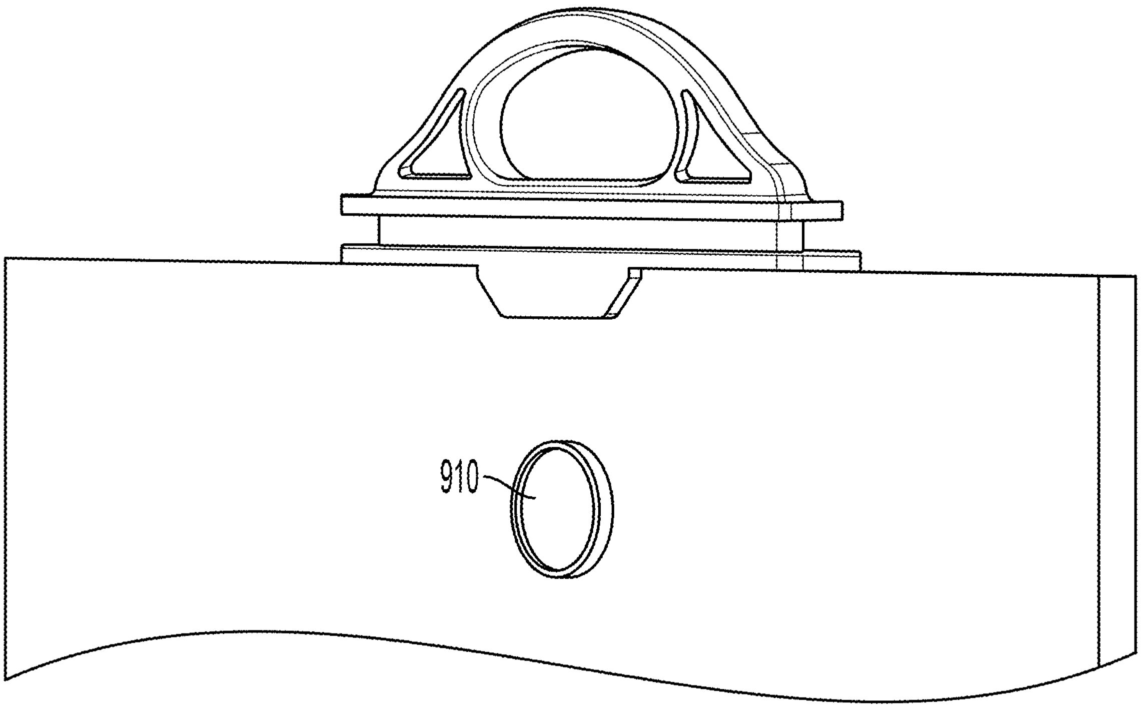
FIGS. 9A-9D illustrate a system for handling and/or displaying a monolithic building material at a point of purchase in accordance with the second preferred embodiment of the present invention.
Figure 9B:
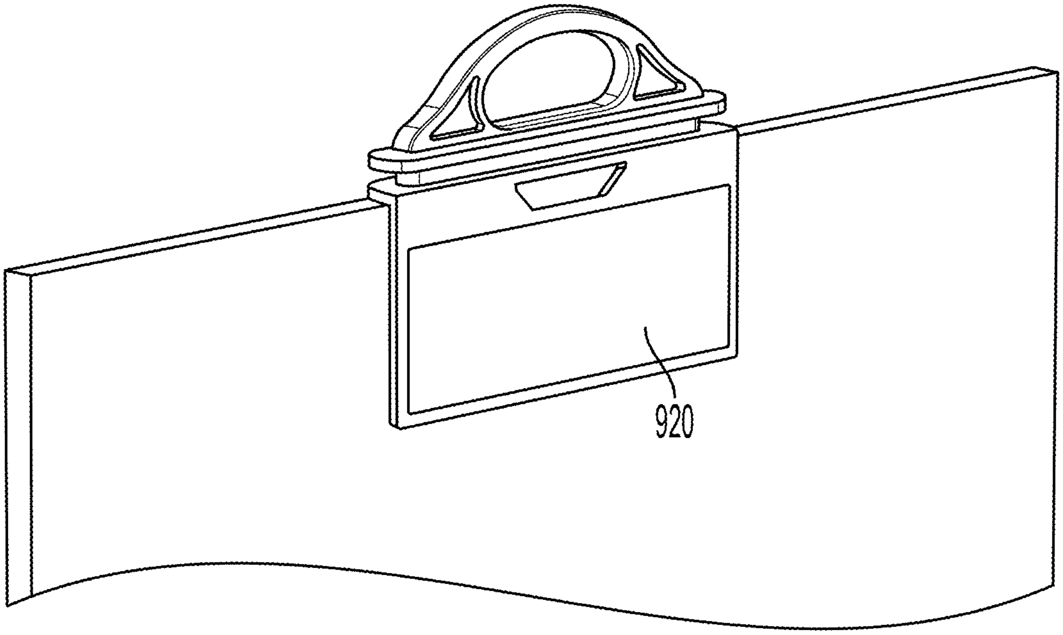
Figure 9C:
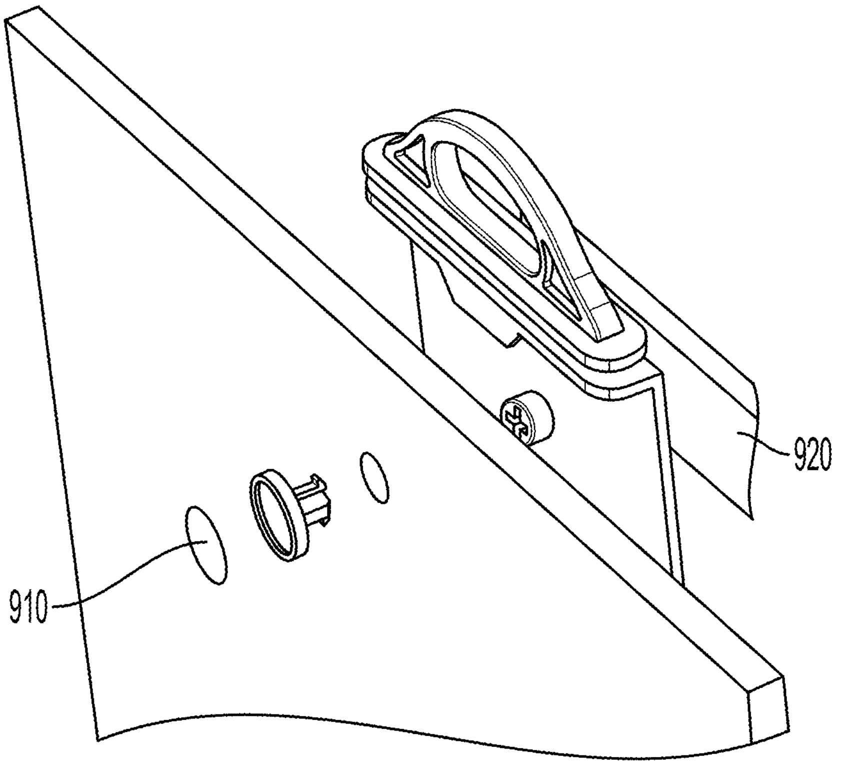
Figure 9D:
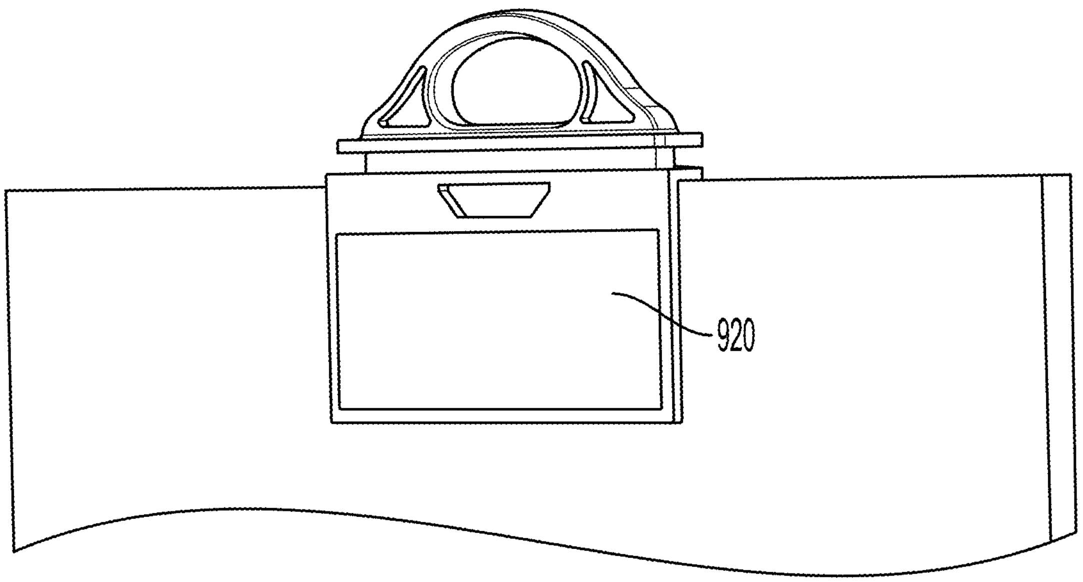

Still further, as shown in FIGS. 6 and 7 a system (600) may include a structure for displaying monolithic building materials. Such a system (600) may include a shelf (610) having a plurality of slots each having a receiver (700) therein for receiving an I-beam structural support member (210). The open end of the slot may be larger than the remainder of the slot in a self-alignment feature. With a system a plurality of monolithic building material supports systems may be held in the shelf 610.

Exemplary methods for manufacturing monolithic building material displays such as is shown in FIGS. 1A-1I is described with reference to FIGS. 11-15. For a tile thickness of 0.28" to 0.42", the method preferably has a repeatability tolerance of +/−0.032125 (1/32") for waterjet cutting a ½" diameter hole in a location 1.5" down from a tope edge of a monolithic building material such as tile. Further, the tolerance of chipping preferably is −0"/+0.1875 (3/16") on the front face of the tile and −0"/+0.750 (¾") on the back face of the tile. The waterjet process preferably produces one part every 3.2 seconds to achieve mass production.

Figure 11:
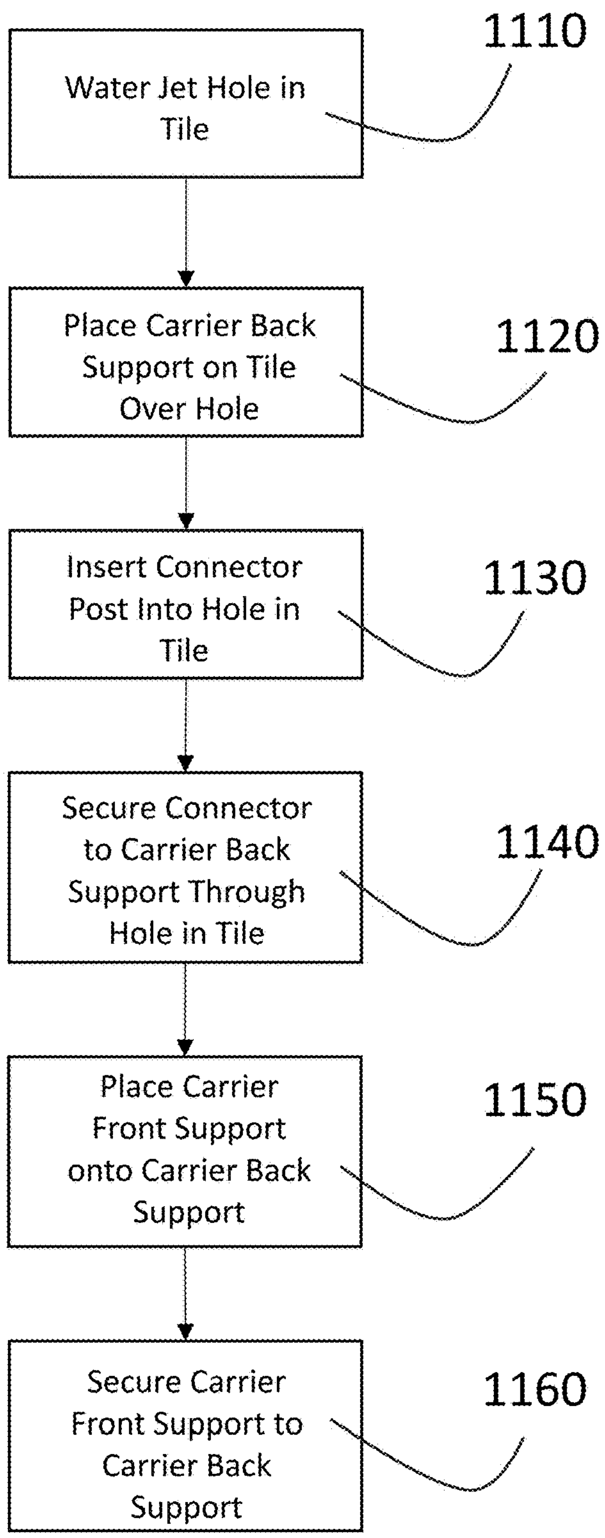
FIG. 11 illustrates a method for assembling a system for handling and/or displaying a monolithic building material at a point of purchase in accordance with the second preferred embodiment of the present invention.
Figure 12:
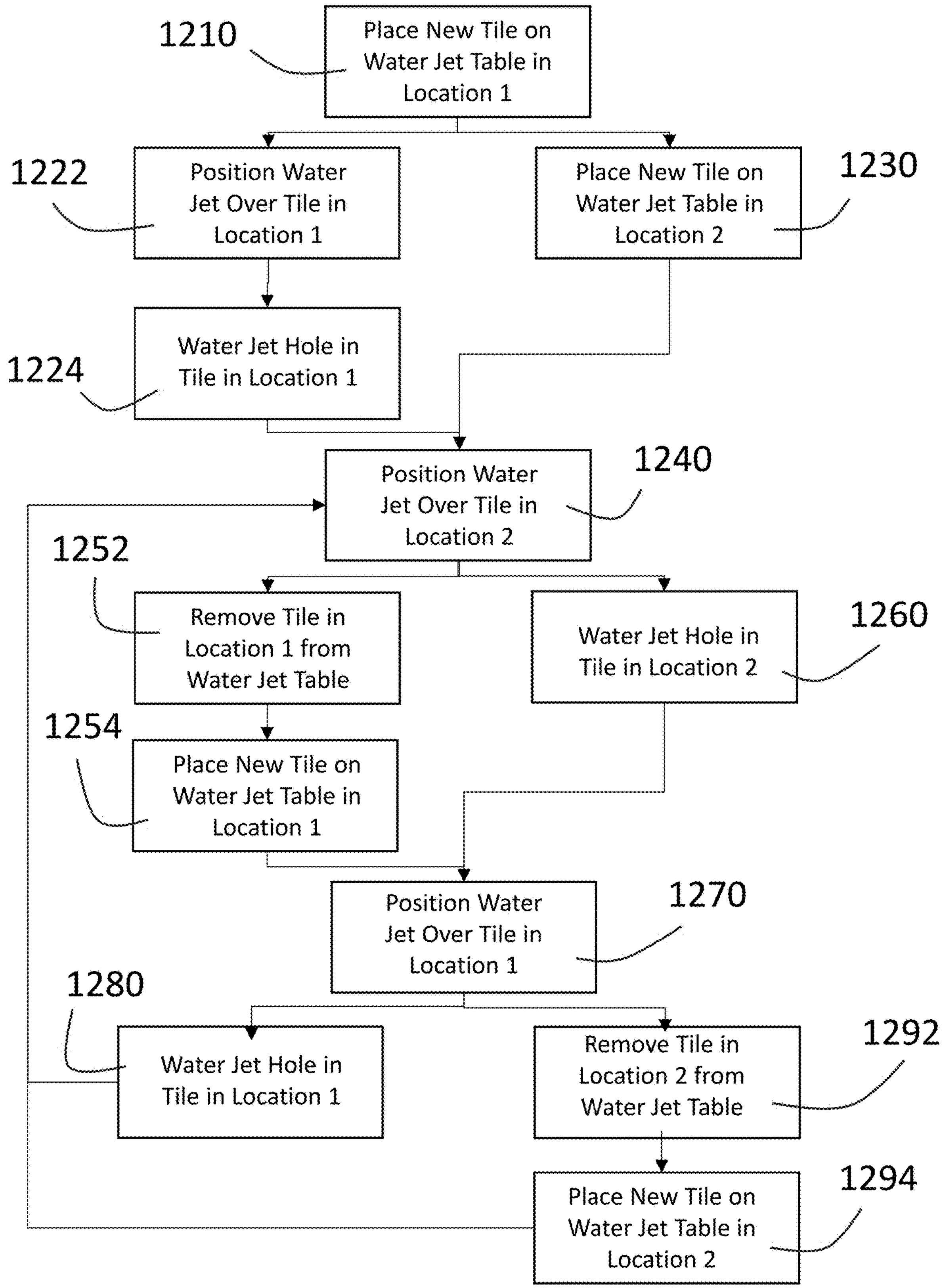
FIG. 12 illustrates a method for water jetting holes in monolithic building materials in systems for handling and/or displaying a monolithic building material at a point of purchase in accordance with the second preferred embodiment of the present invention

As shown in FIG. 11, a hole is water jetted into a monolithic building material such as a tile (1110). A back support or carrier back (200) is placed on the back of the tile (110) over the hole (112) to prepare for it to be secured to the tile (1120). A connector (400) has its post (420) inserted into the hole (112), so it is aligned with the hole in the back support member (1130). The connector is then secured to the back support member with a screw (1140). A carrier front support (300) is place on the carrier back support (200) (1150). The carrier front support is then secured to the carrier back support with screws (1160). A cover is then secured on the back side of the back support.

Waterjet systems commonly are robotic such that the waterjet can be moved relative to an item and cut patterns or holes in the item. Such a robotic waterjet system is used in a preferred embodiment of the present invention. A first method for water jetting holes in monolithic building materials such as tile is described with reference to FIG. 12. In this simplest methods, a waterjet table has first and second fixture cavities for holding tiles during the waterjet process. A new tile is place in the first fixture cavity (1210). A robotic waterjet is position over the tile in the first fixture cavity (1222) and water jetting of the holes in the tile commences (1224). While that water jetting proceeds, a new tile is placed in the second fixture cavity. When the water jetting of the tile in the first fixture cavity is completed, the waterjet is positioned over the tile in the second fixture cavity (1240). This can be accomplished by moving the waterjet, but moving the fixture cavities, or a combination of both. Water jetting of the tile in the second fixture cavity then is commenced. (1260). While water jetting proceeds, the tile in the first fixture cavity is removed (1252) and a new tile is placed in the first fixture cavity (1254). When the water jetting of the tile in the second fixture cavity is completed, the waterjet is positioned over the new tile in the first fixture cavity (1270). Water jetting of the new tile in the first fixture cavity is then commenced. (1280). While water jetting proceeds, the tile in the second fixture cavity is removed (1292) and a new tile is place in the second fixture cavity (1294). The waterjet is then positioned over the new tile in the second fixture cavity (1240) and the process is repeated.

Figure 13:
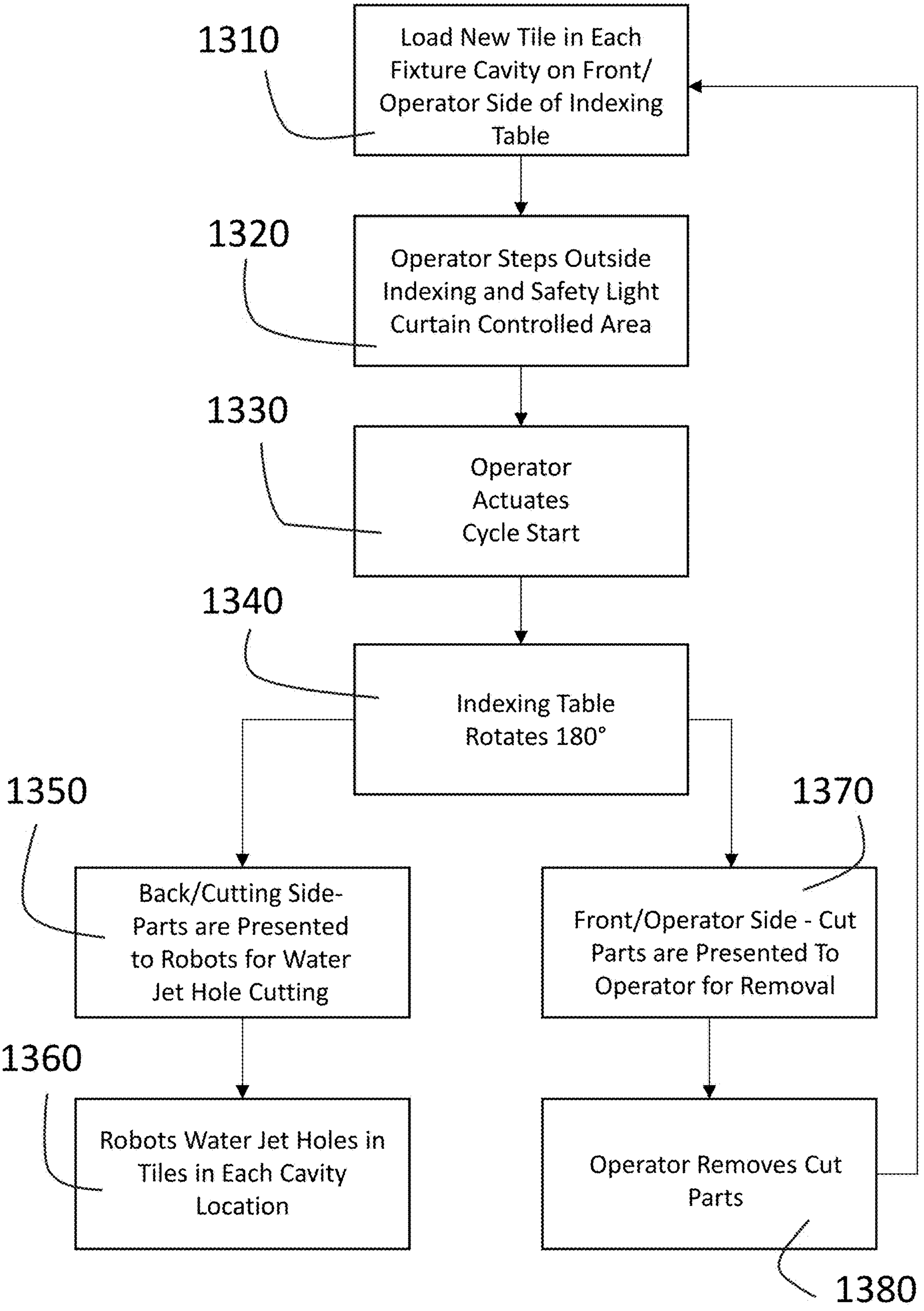
FIG. 13 illustrates a second method for water jetting holes in monolithic building materials in systems for handling and/or displaying a monolithic building material at a point of purchase in accordance with the second preferred embodiment of the present invention.
Figure 14:
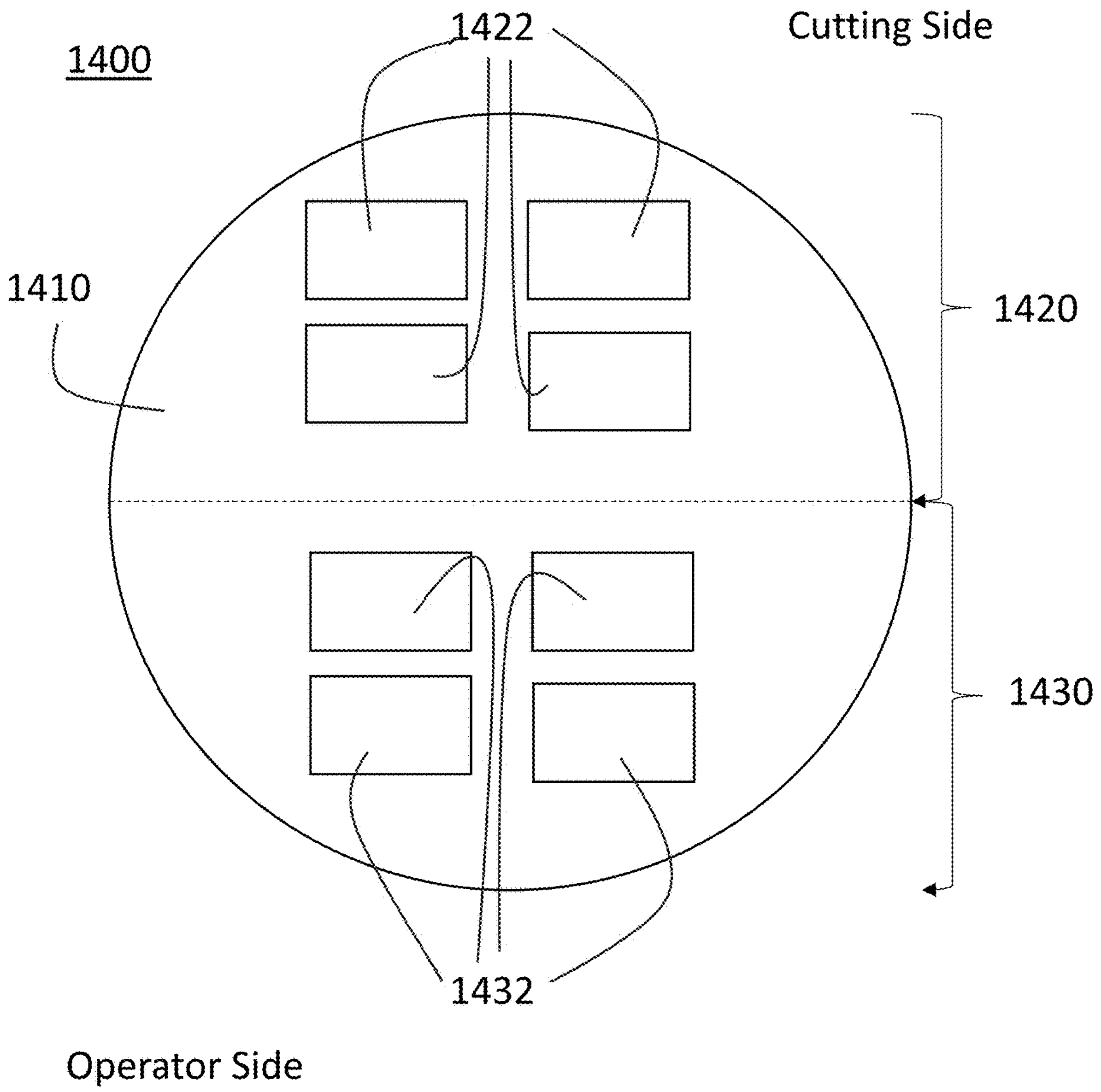
FIG. 14 illustrates an indexing table used in the second method for water jetting holes in monolithic building materials in systems for handling and/or displaying a monolithic building material at a point of purchase in accordance with the second preferred embodiment of the present invention.

A preferred method for water jetting holes in monolithic building materials such as tile is described with reference to FIGS. 13 and 14. As shown in FIG. 14, this method utilized a rotating index table (1410) having an operator side and a cutting side with a barrier above an axis between the two sides. A robotic water jetting system is on the cutting side of the rotating index table (1410). Each side (1420, 1430) of the rotating index table has a plurality of fixture cavities (1422, 1432) for holding tiles. The process begins with new tiles being loaded into the fixture cavities in the front/operator side of the rotating index table (1310). The operator then steps out of the room for safety (1320) and actuates the cycle start (1330). The rotating index table then rotates 180° (1340) such that the new tiles are presented on the cutting side to the robot for waterjet hole cutting (1350). The robot then waterjets holes in the tiles in each fixture cavity on the cutting side (1360). When the table was rotated, any cut parts are presented to the operator (1370). The operator removes those cut tiles (1370) and places new tiles in the fixture cavities now on the operator side (1310) to start a new cycle.

One of skill in the art will understand that the methods described herein for water jetting monolithic building materials such as tile can be expanded to incorporate multiple robotic waterjets and larger and/or more complicated systems for indexing or conveying materials to be water jetted.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described to explain the principles of the invention and its practical application to enable one skilled in the art to utilize the invention in various embodiments as are suited to the particular use contemplated. It is intended that the scope of the invention be defined by the claims appended hereto and their equivalents. The entirety of each of the aforementioned documents is incorporated by reference herein.

What is claimed is:

1. A method for manufacturing monolithic build material display systems using a robotic water jet and an indexing table having a plurality of fixture cavities in first and second locations on the table, the method comprising:

loading a rigid building material having a density greater than 1300 kg/m$^3$ into each of a plurality of fixture cavities in said first location of said indexing table;

rotating said indexing table to place said rigid building materials in said plurality of fixture cavities in said first location on said indexing table within a range of said robotic water jet;

water jet cutting a hole in said rigid building material in each fixture cavity in said first location in said indexing table;

loading a rigid building material having a density greater than 1300 kg/m$^3$ into each of a plurality of fixture cavities in said second location of said indexing table;

rotating said indexing table to place said rigid building materials in said plurality of fixture cavities in said second location on said indexing table within a range of said robotic water jet;

water jet cutting a hole in said rigid building materials in each fixture cavity in said second location in said indexing table;

removing said rigid building materials in said plurality of fixture cavities in said first location in said indexing table;

connecting a rigid building material carrier to each rigid building material removed from said plurality of cavities in said first location using the hole cut in said rigid building material, wherein said rigid building material carrier comprises:

a structural member with an I-shaped cross-section;

a back support member extending from a rear side of a bottom of said structural member onto a back face of said rigid building material, said back support having a hole for receiving a pin, said hole in said back support being aligned with said hole in said rigid building material;

a front support connected to said back support, said front support having a front support member extending from a front side of a bottom of said front support onto a front face of said rigid building material; and a connector having a head on a front side of said rigid building material and a pin extending from said head on said front face of said rigid building material, through said hole in said rigid building material and secured in said hole in said back support member.

2. The method for manufacturing monolithic build material display systems of claim 1 wherein said rigid building material carrier further comprises a handle extending from a top side of said structural member.

3. The method for manufacturing monolithic build material display systems of claim 2 wherein said handle has an opening ergonomically shaped to receive three or four fingers.

4. The method for manufacturing monolithic build material display systems of claim 1 wherein said rigid building material comprises one of ceramic, porcelain, or stone.

5. The method for manufacturing monolithic build material display systems of claim 1 wherein said rigid building material comprises one of ceramic tile, porcelain tile, glass tile, granite tile, travertine, quartzite, sandstone, stone, concrete, Cementous siding, slate, and pavers.

6. The method for manufacturing monolithic build material display systems of claim 1 wherein said structural member, said front support, and said back support comprise injection-molded plastic.

7. The method for manufacturing monolithic build material display systems of claim 1 wherein said structural member, said front support member, and said back support member comprise aluminium.

8. The method for manufacturing monolithic build material display systems of claim 1 wherein said back support member has a front side facing said rigid building material and a backside having printed matter.

9. The method for manufacturing monolithic build material display systems of claim 1 wherein printed matter on said backside of said back support member comprises a label.

10. The method for manufacturing monolithic build material display systems of claim 1 wherein said hole is within three inches of a side of said rigid building material.

11. A method for displaying monolithic building materials, the method comprising:

(a) making a hole in a monolithic building material with a water jet;

(b) connecting an I-beam support member to the monolithic building material with a male/female connector through the hole in the monolithic building material; and (c) sliding the I-beam support connected to the building material into a receiver in a slot in a display stand.

12. The method for displaying monolithic building materials according to claim 11 further comprising:

repeating steps (a), (b) and (c) for a second monolithic building material to create a single display of a plurality of monolithic building materials.

13. The method for displaying monolithic building materials according to claim 12 wherein the display stand comprises one of a vertical display, a horizontal display, and a display integral with a workstation.

14. A method for manufacturing monolithic build material display systems using a robotic water jet and an indexing table having a plurality of fixture cavities on the table, wherein said indexing table has an operator side and a cutting side, the method comprising:

loading a rigid building material having a density greater than 1300 $kg/m^3$ into each of a plurality of fixture cavities on said operator side of said indexing table;

rotating said indexing table to place said rigid building materials in said plurality of fixture cavities on said indexing table to said cutting side so they are within a range of said robotic water jet;

a water jet cutting a hole in said rigid building material in each fixture cavity in said indexing table;

rotating said indexing table to place said rigid building materials in said plurality of fixture cavities on said indexing table to said operator side of said indexing table;

removing said rigid building materials in said plurality of fixture cavities;

connecting a rigid building material carrier to each rigid building material removed from said plurality of cavities using the hole cut in said rigid building material, wherein said rigid building material carrier comprises:

a structural member with an I-shaped cross-section;

a back support member extending from a rear side of a bottom of said structural member onto a back face of said rigid building material, said back support having a hole for receiving a pin, said hole in said back support being aligned with said hole in said rigid building material;

a front support connected to said back support, said front support having a front support member extending from a front side of a bottom of said front support onto a front face of said rigid building material;

and a connector having a head on a front side of said rigid building material and a pin extending from said head on said front face of said rigid building material, through said hole in said rigid building material and secured in said hole in said back support member.

* * * * *